United States Patent
Funaki et al.

(10) Patent No.: US 6,849,207 B2
(45) Date of Patent: Feb. 1, 2005

(54) SILICON NITRIDE SINTERED MATERIAL AND PRODUCTION PROCESS THEREOF

(75) Inventors: Kouji Funaki, Gifu (JP); Katsura Matsubara, Aichi (JP); Hiroki Watanabe, Gifu (JP); Masaya Ito, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 302 days.

(21) Appl. No.: 10/024,015

(22) Filed: Dec. 21, 2001

(65) Prior Publication Data

US 2002/0134774 A1 Sep. 26, 2002

(30) Foreign Application Priority Data

Dec. 28, 2000 (JP) ........................................ 2000-402257

(51) Int. Cl.⁷ .................... H01B 1/04; C04B 35/565; C04B 35/584; F23Q 7/22
(52) U.S. Cl. .................... 252/516; 252/521.3; 501/92; 501/97.4; 219/270
(58) Field of Search .................. 501/92, 97.4; 219/270; 123/145 A; 252/516, 521.3

(56) References Cited

U.S. PATENT DOCUMENTS

| | | | |
|---|---|---|---|
| 4,407,970 A | | 10/1983 | Komatsu et al. |
| 4,977,112 A | | 12/1990 | Matsui |
| 5,096,859 A | * | 3/1992 | Sakai et al. .................. 501/92 |
| 5,177,038 A | * | 1/1993 | Takahashi et al. ............ 501/92 |
| 5,238,882 A | * | 8/1993 | Takahashi et al. ............ 501/92 |
| 5,523,267 A | * | 6/1996 | Tanaka et al. ................ 501/92 |
| 6,657,166 B2 | * | 12/2003 | Funaki et al. ............... 219/270 |

FOREIGN PATENT DOCUMENTS

| | | |
|---|---|---|
| EP | 0 397 464 A | 11/1990 |
| EP | 0 493 802 A1 | 7/1992 |
| JP | 64-61356 | 3/1989 |
| JP | 6-251862 | 9/1994 |
| JP | 9-180866 | 7/1997 |
| JP | 10-25162 | 1/1998 |
| JP | 10-300086 A | 11/1998 |
| WO | WO 95/33701 A | 12/1995 |

OTHER PUBLICATIONS

European Search Report for EP 01 31 0900 dated Mar. 25, 2002.

* cited by examiner

*Primary Examiner*—Mark Kopec
(74) *Attorney, Agent, or Firm*—Sughrue Mion, PLLC

(57) ABSTRACT

A silicon nitride sintered material containing a silicon nitride component and silicon carbide having an average particle size of 1 μm or less in an amount of at least 1 mass % and less than 4 mass %, based on 100 mass % of the silicon nitride component. The carbide is dispersed in the silicon nitride component, and the silicon nitride sintered material has a thermal expansion coefficient of at least 3.7 ppm/° C. between room temperature and 1,000° C. The silicon nitride component contains a rare earth element in an amount of 15–25 mass % as reduced to a certain oxide thereof and Cr in an amount of 5–10 mass % as reduced to a certain oxide thereof, and a crystalline phase is present in intergrain regions of the sintered material.

5 Claims, 1 Drawing Sheet

US 6,849,207 B2

SILICON NITRIDE SINTERED MATERIAL AND PRODUCTION PROCESS THEREOF

BACKGROUND OF THE INVENTION

1. Field of the Invention

The present invention relates to a silicon nitride sintered material and to a production process thereof. More particularly, the present invention relates to a silicon nitride sintered material which has a high thermal expansion coefficient, which maintains excellent insulating property, and which has high heat resistance so as to be suitable for use as an insulating material, such as a base material for ceramic glow plugs, as well as to a production process thereof.

2. Description of the Related Art

Conventionally, silicon nitride sintered material, having excellent mechanical characteristics, heat resistance, and anti-corrosion properties, has been employed as an insulating material for use in ceramic heaters in which a resistance heater is embedded, or as an insulating material in similar products. In this case, the silicon nitride sintered material must have a high insulating property. When silicon nitride sintered material is used as an insulating material, a problem arises in that since tungsten, tungsten carbide, molybdenum silicide, or a similar substance, which is generally employed as a resistance heater, has a thermal expansion coefficient higher than that of silicon nitride, cracks are generated in the insulating material as a result of the difference in thermal expansion coefficient during application of heat or generation of heat. In order to prevent the generation of cracks, the thermal expansion coefficient of the insulating material must be substantially as high as that of the resistance heater. Therefore, when the silicon nitride sintered material is used as an insulating material for ceramic heaters, etc., the sintered material must have a high insulating property and a high thermal expansion coefficient.

In order to increase the thermal expansion coefficient of the insulating material, conventionally, particles of rare earth element compounds such as oxides or metallic compounds such as carbides, nitrides, and suicides, etc., having a thermal expansion coefficient higher than that of silicon nitride have been incorporated and dispersed, as a high thermal expansion coefficient compound, into raw material powder of the silicon nitride sintered material. Typically, such a high thermal expansion coefficient compound is incorporated into silicon nitride sintered material in an amount of a few % to about 30% by volume.

The aforementioned rare earth element compound or metallic compound has a high thermal expansion coefficient, but its high conductivity raises a problem of lowering the insulating property of the sintered material upon incorporation of such a compound into the sintered material. Particularly when a large amount of a high thermal expansion coefficient compound is incorporated and dispersed in order to suppress a decrease in sinterability and strength, the compound tends to be present continuously in grain boundaries of sintered silicon nitride, to thereby greatly deteriorate the insulating property of the sintered material. In order to suppress such deterioration of insulating property, various studies have been carried out on the compositions and particle sizes of silicon nitride raw material and sintering aids. However, obtaining silicon nitride sintered material having a high thermal expansion coefficient while maintaining its insulating property remains difficult.

SUMMARY OF THE INVENTION

In view of the foregoing, an object of the present invention is to provide a silicon nitride sintered material exhibiting a high thermal expansion coefficient, while maintaining excellent insulating property, and having high heat resistance so as to be suitable for use as an insulating material, such as a base material for ceramic glow plugs, as well as to a production process thereof.

The present inventors have studied the relationship between various components of silicon nitride sintered material and the insulating property and thermal expansion coefficient thereof; and have found that when silicon carbide having a specific particle size is incorporated into a raw material powder in a predetermined amount, excellent insulating property can be maintained at a high level and the thermal expansion coefficient can be increased. The present invention has been accomplished on the basis of this finding.

The above object of the present invention has been achieved by providing a silicon nitride sintered material which comprises a silicon nitride component and silicon carbide having an average particle size of 1 $\mu$m or less in an amount of at least 1 mass % and less than 4 mass %, based on 100 mass % of the silicon nitride component. The carbide is dispersed in the silicon nitride component, and the silicon nitride sintered material has a thermal expansion coefficient of at least 3.7 ppm/° C. between room temperature and 1,000° C.

In the present invention, the aforementioned "silicon nitride component" refers to components that constitute the silicon nitride sintered material other than a silicon carbide component. The silicon nitride component may contain other components so long as silicon nitride is a predominant component in an amount of more than 50 wt %. No particular limitation is imposed on the amounts of the respective components. Examples of the "other components" include rare earth elements (Eu, Sm, Y, Sc, La, Ce, Pr, Nd, Gd, Tb, Dy, Er, Yb, etc.) and Cr. When the silicon nitride component contains a rare earth element or Cr, the rare earth element content is 15–25 mass %, preferably 16–24 mass %, more preferably 17–23 mass %, as reduced to a certain oxide thereof, and the Cr content is 5–10 mass %, preferably 6–10 mass %, more preferably 7–10 mass %, as reduced to a certain oxide thereof. When the rare earth element content and Cr content fall within the above ranges, the mechanical characteristics at high temperature can be improved. As used herein, the amount as reduced to a certain oxide of a rare earth element refers to the amount of a rare earth element contained in a silicon nitride component as reduced to $R_2O_3$ (R: rare earth element), and the amount as reduced to a certain oxide of Cr refers to the amount of Cr contained in a silicon nitride component as reduced to $Cr_2O_3$.

In the present invention, when the aforementioned "silicon carbide" is incorporated and dispersed, aciculation of silicon nitride particles can be prevented. Therefore, particles of silicon nitride, which is an insulating substance, increase in specific surface area, and prevent the formation of paths for conduction of electricity by conductive particles of a high thermal expansion coefficient compound. As a result, while the thermal expansion coefficient of the resultant sintered material is increased, deterioration of the insulating property of the sintered material can be prevented.

The amount of the aforementioned "silicon carbide" is generally at least 1 mass % and less than 4 mass %, preferably 1–3 mass %, more preferably 1.5–2.5 mass %, on the basis of 100 mass % of the aforementioned silicon nitride component. When the amount of silicon carbide is 4 mass % or more, in accordance with an increase in the amount of silicon carbide, the insulation resistance of the resultant sintered material is lowered because of conductivity of the silicon carbide, which is not preferable. In contrast, when the amount of silicon carbide is less than 1 mass %, since aciculation of silicon nitride particles is not prevented, the silicon nitride particles decrease in specific surface area. Consequently, formation of paths for conduction of electricity by a high thermal expansion coefficient compound cannot be prevented, resulting in deterioration of the insulating property of the resultant sintered material, which is not preferable.

The average particle size of the aforementioned "silicon carbide" is 1 µm or less, preferably 0.7 µm or less, more preferably 0.1–0.7 µm. When the average particle size exceeds 1 µm, aciculation of silicon nitride particles cannot be prevented, and thus the resultant sintered material fails to exhibit insulating property, which is not preferable. When silicon carbide having an average particle size of 1 µm or less is used, because of its large specific surface area, the silicon carbide greatly exerts the effect of preventing aciculation of silicon nitride particles, which is preferable. The average particle size of the aforementioned "silicon carbide" refers to the average particle size of carbonized silicon carbide raw material, provided that grains are not formed from silicon carbide particles by sintering.

When the silicon nitride sintered material of the present invention contains a rare earth element, a crystalline phase can be formed in intergrain regions of the sintered material. When a crystalline phase is present in the intergrain regions, mechanical characteristics of the sintered material at high temperatures can be improved, which is preferable. Examples of the crystalline phase include an H phase ($R_{20}Si_{12}N_4O_{48}$) (R: rare earth element), a J phase ($R_4Si_2N_2O_7$) (R: rare earth element), an M phase ($R_2Si_3N_4O_3$) (R: rare earth element), and a disilicate phase ($R_2Si_2O_7$) (R: rare earth element).

In the present invention, the thermal expansion coefficient of the aforementioned silicon nitride sintered material is typically at least 3.7 ppm/° C., preferably at least 3.75 ppm/° C., more preferably at least 3.8 ppm/° C., between room temperature and 1,000° C. When the thermal expansion coefficient of the sintered material falls within the above range, the difference in thermal expansion coefficient between the sintered material and a resistance heater formed from tungsten, tungsten carbide, molybdenum silicide, or similar material can be reduced. As a result, when the sintered material is used as, for example, an insulating material such as a base material of ceramic glow plugs, generation of cracks, which is attributed to the difference in thermal expansion coefficient, can be prevented, which is preferable. The silicon nitride sintered material of the present invention has a high thermal expansion coefficient and exhibits excellent insulating property. Specifically, the insulation resistance of the sintered material as measured using the method described in the following Examples is 10,000 MΩ or more.

The process for producing a silicon nitride sintered material of the present invention is characterized by sintering a raw material powder mixture containing a silicon nitride component and silicon carbide having an average particle size of 1 µm or less in an amount of at least 1 mass % and less than 4 mass %, based on 100 mass % of the silicon nitride component. In the production process of the present invention, no particular limitation is imposed on the sintering method and sintering conditions, so long as a sintered material can be produced. A sintering aid is not necessarily used, and sintering may be carried out at ambient pressure or at high pressure. The sintering temperature is typically 1,650–1,950° C. In order to prevent decomposition of silicon nitride, sintering is generally carried out in a non-oxidizing gas atmosphere containing nitrogen.

In the present invention, no particular limitation is imposed on the aforementioned "silicon nitride component," so long as the component contains silicon nitride or components which are formed into silicon nitride by firing. The silicon nitride component may contain one or more additional components, such as sintering aids. Examples of the "additional components" include rare earth element compounds and Cr compounds. Specific examples of the rare earth element compounds include oxides of rare earth elements (Eu, Sm, Y, Sc, La, Ce, Pr, Nd, Gd, Th, Dy, Er, Yb, etc.), and specific examples of the Cr compounds include $CrSi_2$ and $Cr_5Si_3$. When a rare earth element compound or a Cr compound is incorporated into raw material powder, the amount of the rare earth element contained in the silicon nitride component is 15–25 mass %, preferably 16–24 mass %, more preferably 17–23 mass %, as reduced to a certain oxide thereof, and the amount of Cr contained in silicon nitride component is 5–10 mass %, preferably 6–10 mass %, more preferably 7–10 mass %, as reduced to a certain oxide thereof. When the amount of the rare earth element and the amount of Cr fall within the above ranges, the mechanical characteristics at high temperatures can be improved. When a rare earth element is incorporated into the aforementioned raw material powder mixture, and the resultant mixture is sintered, a crystalline phase can be precipitated in intergrain regions of the resultant silicon nitride sintered material. As a result, mechanical characteristics of the sintered material at high temperatures can be improved.

DESCRIPTION OF THE PREFERRED EMBODIMENTS

Figure 1:
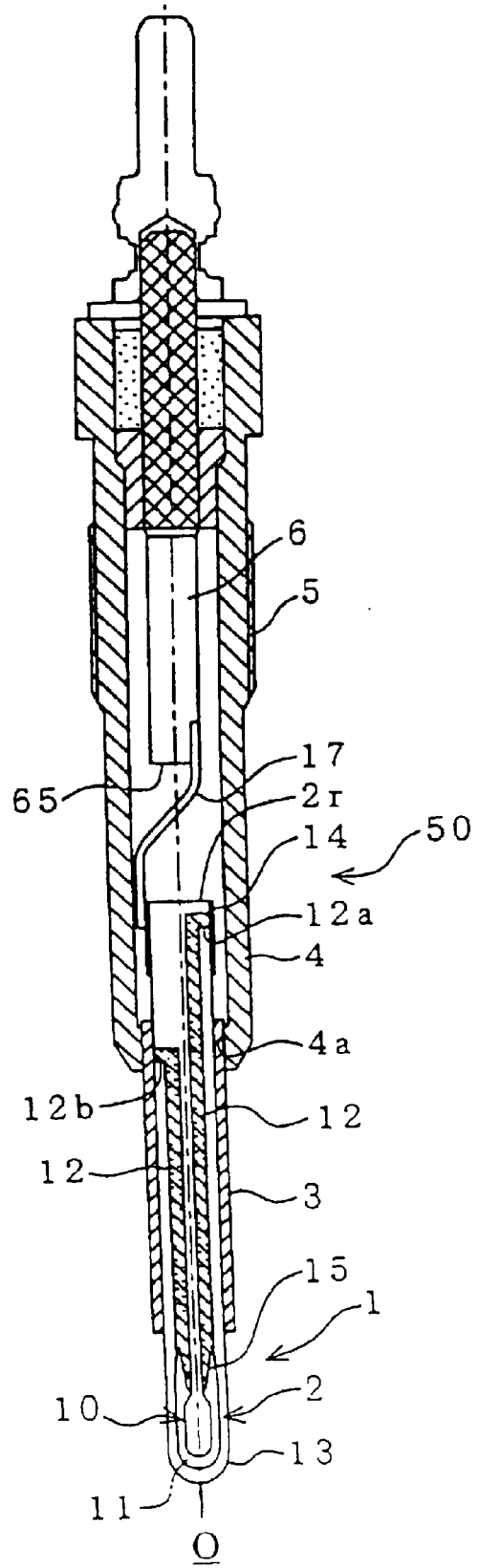
FIG. 1 is a cross sectional longitudinal view of a glow plug.

The present invention will next be described in detail by way of Examples and Comparative Examples. However, the present invention should not be construed as being limited thereto.

In a first embodiment, $Si_3N_4$ powder (average particle size:0.7 µm), $Y_2O_3$ powder, which is a rare earth element oxide (average particle size:1.0–3.0 µm), and a Cr compound powder ($Cr_2O_3 \cdot CrSi_2$) (average particle size:1.0 µm), serving as raw materials, were mixed with silicon carbide powder having an α crystal structure (average particle size:1.0 µm) so as to attain a formulation shown in Table 1, to thereby prepare a raw material powder mixture. Subsequently, the resultant powder mixture was wet-mixed in ethanol for 16 hours by use of $Si_3N_4$ grinding balls, and then dried in a hot water bath. Thereafter, the resultant powder mixture was fired for 0.5 hours by hot pressing in a nitrogen atmosphere at 1,800° C. and 25 MPa, to thereby yield a sintered material having dimensions of 45 mm×45 mm×5 mm (sintered materials Nos. 1 through 15).

Each of the sintered materials Nos. 1 through 15 was subjected to measurement of thermal expansion coefficient and insulation resistance. The results are shown in Table 1. As shown in Table 1, sintered materials of sample Nos. with no mark (i.e., Examples) fall within the scope of the present invention, and sintered materials of sample Nos. marked with * (i.e., Comparative Examples) fall outside the scope of the present invention. In order to determine the thermal expansion coefficient in parts per million per degree of change in temperature (ppm/° C.), each of the sintered materials Nos. 1 through 15 was formed into a test piece having dimensions of 3 mm×4 mm ×15 mm, and the length of the test piece was measured in a nitrogen atmosphere at temperatures between room temperature and 1,000° C. The thermal expansion coefficient was calculated on the basis of the thus-measured length by means of the below-described formula. In order to determine insulation resistance (MΩ), each of the sintered materials Nos. 1 through 15 was formed into a test piece having dimensions of 3 mm×4 mm×15 mm; alligator clip terminals connected to Super MegOhm Checker SM-8205 (product of DKK-TOA Corporation), serving as a measurement apparatus, were applied to both ends of the test piece at room temperature; and then a voltage of 1,000 V was applied to the test piece for one minute, to thereby measure the resistance of the test piece.

$$D = -\{(A-B)/[C \times (1{,}000-30)]\} + 8.45 \times 10^{-6}$$

A: Standard sample length (mm) at 1,000° C.

B: Measurement sample length (mm) at 1,000° C.
C: Measurement sample length (mm) at 30° C.
D: Thermal expansion coefficient

TABLE 1

| Sample No. | Silicon nitride (mass %) | Rare earth element oxide (mass %) | Cr compound (mass %) | Silicon carbide (mass %) | Thermal expansion coefficient (ppm/° C.) | Insulation resistance (×10³ MΩ) |
|---|---|---|---|---|---|---|
| *1 | 80 | 15 | 5 | 0 | 3.7 | 8 |
| 2 | 80 | 15 | 5 | 1 | 3.7 | 20 |
| 3 | 80 | 15 | 5 | 2 | 3.7 | 100 |
| 4 | 80 | 15 | 5 | 3 | 3.7 | 25 |
| *5 | 80 | 15 | 5 | 4 | 3.7 | 9 |
| *6 | 75 | 15 | 10 | 0 | 3.9 | 7 |
| 7 | 75 | 15 | 10 | 1 | 3.9 | 14 |
| 8 | 75 | 15 | 10 | 2 | 3.9 | 70 |
| 9 | 75 | 15 | 10 | 3 | 3.9 | 21 |
| *10 | 75 | 15 | 10 | 4 | 3.9 | 7 |
| *11 | 65 | 25 | 10 | 0 | 4.1 | 5 |
| 12 | 65 | 25 | 10 | 1 | 4.1 | 11 |
| 13 | 65 | 25 | 10 | 2 | 4.1 | 50 |
| 14 | 65 | 25 | 10 | 3 | 4.1 | 20 |
| *15 | 65 | 25 | 10 | 4 | 4.1 | 6 |

In a second embodiment, $Si_3N_4$ powder (average particle size: 0.7 μm) (75 mass %), $Y_2O_3$ powder, which is a rare earth element oxide (average particle size: 1.0–3.0 μm) (15 mass %), and a powder of Cr compounds ($Cr_2O_3$ and $CrSi_2$) (average particle size:1.0 μm) (10 mass %) were mixed together to thereby prepare a raw material powder, and silicon carbide powder having an α crystal structure (average particle size:0.1–3.0 μm) (2 mass %) was incorporated into the raw material powder on the basis of 100 mass % of the raw material powder, to thereby prepare a raw material powder mixture. Subsequently, the resultant powder mixture was wet-mixed in ethanol for 16 hours by use of $Si_3N_4$ grinding balls, and then dried in a hot water bath. Thereafter, the resultant powder mixture was fired for 0.5 hours by hot pressing in a nitrogen atmosphere at 1,800° C. and 25 MPa, to thereby yield a sintered material having dimensions of 45 mm×45 mm×5 mm (sintered materials Nos. 16 through 20). Each of the sintered materials Nos. 16 through 20 was subjected to measurement of thermal expansion coefficient and insulation resistance. The results are shown in Table 2. As shown in Table 2, sintered materials Nos. 16 through 18 fall within the scope of the present invention, and sintered materials Nos. 19 and 20 fall outside the scope of the present invention. The thermal expansion coefficient (ppm/° C.) and insulation resistance (MΩ) were measured in a manner similar to that of the first Embodiment described above.

TABLE 2

| Sample No. | Silicon nitride (mass %) | Rare earth element oxide (mass %) | Cr compound (mass %) | Silicon carbide (mass %) | Silicon carbide (μm) | Thermal expansion coefficient (ppm/° C.) | Insulation resistance (×10³ MΩ) |
|---|---|---|---|---|---|---|---|
| 16 | 75 | 15 | 10 | 2 | 0.1 | 3.9 | 1000 |
| 17 | 75 | 15 | 10 | 2 | 0.6 | 3.9 | 300 |
| 18 | 75 | 15 | 10 | 2 | 1.0 | 3.9 | 70 |
| *19 | 75 | 15 | 10 | 2 | 1.2 | 3.9 | 9 |
| *20 | 75 | 15 | 10 | 2 | 3.0 | 3.9 | 2 |

In a third embodiment, the silicon nitride sintered materials of the first and second embodiments were incorporated into glow plugs for testing. FIG. 1 shows an example of the glow plug according to the present invention in which the construction of an inner portion thereof is illustrated. The glow plug 50 has a ceramic heater 1 and an outer metal cylinder 3 retaining the same, and a main metal member 4 joined to the metal cylinder. The ceramic heater 1 has a shape of a rod, and a resistance heating element 11 is buried in a front end portion 2 thereof. A first heater terminal 12a for supplying current to the resistance heating element 11 is formed in an exposed state on an outer circumferential surface of a rear end portion of the heating element. The outer metal cylinder 3 is formed tubularly, and holds the ceramic heater 1 on an inner side thereof so that a rear end portion and a front end portion 2 thereof project from the metal cylinder in the axial direction O thereof. The main metal member 4 is formed tubularly so as to be joined coaxially to the outer metal cylinder 3.

The main metal member 4 is provided on an outer circumferential surface thereof with a threaded portion 5 as a fixing portion for securing the glow plug 50 to an engine block (not shown), and a metal shaft 6 is fixed to a rear end portion of the main metal member. The metal shaft 6 is formed in the shape of a rod, and inserted into an inner side of the rear end portion of the main metal member 4 in the axial direction O. The metal shaft 6 is disposed so that a front end surface 65 thereof is opposed in the axial direction O to a rear end surface 2r of the ceramic heater 1. A metal terminal ring 14 electrically connected to the first heater terminal 12a is fixed in a close fitted state on an outer circumferential surface of a rear end portion of the ceramic heater 1 so as to cover the first heater element 12a. The metal shaft 6 and first heater terminal 12a are electrically connected together via a metal lead member 17 joined at one end thereof to the terminal ring 14, and at the other end thereof to the metal shaft 6. Since the metal lead member 17 is fixed to the terminal ring 14 by a metal/metal connection, a complicated structure requiring a high manday, such as a metal/ceramic material soldered structure, and a structure in which the metal lead member 17 is connected to the ceramic heater 1 by burying the former in the latter is eliminated. This enables the glow plug to be manufactured at low cost. Since the terminal ring 14 is fitted on the ceramic heater 1 by close fitting, a solder layer such as that formed by a soldering method in a related art structure is not interposed therebetween, so that a concentricity of the metal shaft 6 and terminal ring 14 is easily secured. Owing to such a structure, the slippage of joint surfaces of the metal lead member 17 and metal shaft 6 or terminal ring 14 becomes hard to occur, and, in turn, a joint portion of a good quality and a high strength can be formed.

A second heater terminal 12b for supplying a current to the resistance heating element 11 is formed in an exposed state on the portion of the outer circumferential surface of the ceramic heater 1 which is ahead of the first heater terminal 12a in the axial direction O. The tubular metal cylinder 3 covering and electrically connected to the second heater terminal 12b is fixed in a close fitted state on an outer circumferential surface of the ceramic heater 1 with a rear end portion of the ceramic heater 1 projected in the rearward direction thereof. The main metal member 4 is fixed at a cylindrical heater holding surface 4a thereof to the outer circumferential surface of the outer metal cylinder 3.

Owing to this structure, the outer metal cylinder 3 and terminal ring 14 are fixed in a close fitted state on both of the two heater terminals 12a, 12b used to supply current to the ceramic heater 1. The assembled structure of the glow plug is thereby further simplified.

The second heater terminal 12b is disposed ahead of the first heater terminal 12a in the axial direction O and the outer metal cylinder 3 is also used as a terminal ring with the main metal member 4 fixed to the outer metal cylinder 3. According to this structure, the outer metal cylinder 3 is also used as a terminal ring. This enables the number of parts to be reduced, and the glow plug according to the present invention to be provided at a lower cost.

The main metal member 4 is fixed to the outer surface of the outer metal cylinder 3 to be exact. According to this arrangement, the outer metal cylinder 3 interposed between the main metal member 4 and ceramic heater 1 is used as a spacer, so that a suitable width of clearance can be formed between the outer circumferential surface of a rear end portion of the ceramic heater 1 projected rearward from the outer metal cylinder 3 and the portion of the inner circumferential surface of the main metal member 4 which is on the rear side of the heater holding surface 4a thereof. This makes it easier to provide the terminal ring 14 on the rear end portion of the ceramic heater 1.

The ceramic heater 1 is formed as a rod type ceramic heater element in which the resistance heating element 11 is buried in a ceramic base member 13 formed of an insulating ceramic material. In this embodiment, the ceramic heater 1 is formed as a ceramic heater in which a ceramic resistor 10 formed of a conductive ceramic material is buried in the ceramic base member 13 formed of an insulating ceramic material. The ceramic resistor 10 is formed of a first conductive ceramic material provided in a front end portion of the ceramic heater 1, and has a first resistor portion 11 functioning as a resistance heating element, and a pair of second resistor portions 12, 12 disposed at the rear of the first resistor portion 11 so as to extend in the axial direction O of the ceramic heater 1, joined at front end portions thereof to both end portions in the current supplying direction of the first resistor portion 11, and formed of a second conductive ceramic material a resistivity of which is lower than that of the first conductive ceramic material. The two second resistor portions 12, 12 of the ceramic resistor 10 have branching sections formed at the parts thereof which are in positions of mutually different heights in the axial direction O. The parts of these branching sections which are exposed to the surface of the ceramic heater 1 form the first heater terminal 12a and second heater terminal 12b, respectively.

In the third embodiment, the silicon nitride ceramic material of the first and second embodiments is employed as an insulating ceramic material constituting the ceramic base member 13.

Ten of the above described glow plugs were produced with ceramic base members 13 made from each of the sintered materials Nos. 1 through 20 having compositions shown in Tables 1 and 2, and each glow plug ceramic base member 13 was subjected to an electricity-application cycle test (maximum: 10,000 cycles). The glow plug was connected to a power source, and in each cycle, the ceramic base member 13 was heated to a saturation temperature of 1,400° C. under application of electricity for one minute, and then application of electricity was stopped for one minute. The results of the electricity-application cycle test are shown in Table 3. As shown in Table 3, when no problem arises in the ten glow plugs, a rating "O" is assigned; when problems arise in at least one of the glow plugs due to a decrease in insulation resistance of the base material, a rating "Δ" is assigned; and when problems arise in all ten glow plugs due to a decrease in insulation resistance of the base material, a rating "×" is assigned.

TABLE 3

| Sample No. | Insulation resistance (×10³ MΩ) | Electricity-application cycle |
| --- | --- | --- |
| *1 | 8 | Δ |
| 2 | 20 | O |
| 3 | 100 | O |
| 4 | 25 | O |
| *5 | 9 | Δ |
| *6 | 7 | Δ |
| 7 | 14 | O |
| 8 | 70 | O |
| 9 | 21 | O |
| *10 | 7 | Δ |
| *11 | 5 | X |
| 12 | 11 | O |
| 13 | 50 | O |
| 14 | 20 | O |
| *15 | 6 | Δ |
| 16 | 1000 | O |
| 17 | 300 | O |
| 18 | 70 | O |
| *19 | 9 | Δ |
| *20 | 2 | X |

As shown in Table 1, in the first Embodiment in which the silicon carbide content is varied, sintered materials Nos. 1, 6, and 11, containing no silicon carbide, and sintered materials Nos. 5, 10, and 15, in which silicon carbide is incorporated in an amount of 4 mass % and dispersed, have an insulation resistance of 5,000–8,000 MΩ. In contrast, sintered materials Nos. 2 through 4, 7 through 9, and 12 through 14, in which silicon carbide is incorporated in an amount of 1–3 mass %, have an insulation resistance as high as 11,000–100,000 MΩ. The results show that, when the incorporation amount of silicon carbide is at least 1 mass % and less than 4 mass %, the thermal expansion coefficient of the sintered material is increased, and the insulating property is improved.

As shown in Table 2, in the second Embodiment in which the average particle size of silicon carbide to be incorporated and dispersed is varied, sintered material No. 19, in which the average particle size of silicon carbide is 1.2 μm, and sintered material No. 20, in which the average particle size of silicon carbide is 3.0 μm, have insulation resistances of 2,000 MΩ and 9,000 MΩ, respectively. In contrast, sintered materials Nos. 16 through 18, in which the average particle size of silicon carbide is 1.0 μm or less, have an insulation resistance of as high as 70,000–1,000,000 MΩ. The results show that, when the average particle size of silicon carbide is 1.0 μm or less, the thermal expansion coefficient of the sintered material is increased, and the insulating property is improved.

As shown in Table 3, the results of the electricity-application cycle test of the glow plugs with ceramic base members 13 produced from the sintered materials Nos. 1 through 20 of Tables 1 and 2 show that the glow plugs with ceramic base members 13 produced from sintered materials Nos. 2 through 4, 7 through 9, 12 through 14, and 16 through 18, which fall within the scope of the present invention, result in no problem, whereas the glow plugs with ceramic base members 13 produced from sintered materials Nos. 1, 5, 6, 10, 11, 15, 19, and 20, which fall outside the scope of the present invention, result in problems. The test results show that the glow plugs with ceramic base members 13 produced from the sintered materials which fall within the scope of the present invention exhibit excellent durability in the electricity-application cycle test, whereas the glow plugs produced with the sintered materials which fall outside the scope of the present invention exhibit poor durability due to a decrease in the insulation resistance of the base material.

The present invention is not limited to the aforementioned Examples, and various modifications may be made in accordance with purposes and uses.

Since the silicon nitride sintered material of the present invention contains a silicon nitride component in an amount of 100 mass % and silicon carbide having an average particle size of 1 μm or less in an amount of at least 1 mass % and less than 4 mass %, with the carbide being dispersed in the silicon nitride component, the sintered material has a high thermal expansion coefficient, and maintains an excellent insulating property. When the silicon nitride component contains a rare earth element in an amount of 15–25 mass % as reduced to a certain oxide thereof or Cr in an amount of 5–10 mass % as reduced to a certain oxide thereof, or when a crystalline phase is precipitated in intergrain regions of the sintered material, the sintered material has a high thermal expansion coefficient, with excellent insulating property being maintained, and mechanical characteristics of the sintered material at high temperatures can be improved. Therefore, the silicon nitride sintered material of the present invention is suitable for use as, for example, a base material for ceramic glow plugs. According to the process for producing a silicon nitride sintered material of the present invention, a silicon nitride sintered material can be produced exhibiting the aforementioned characteristics.

This application is based on Japanese Patent Application No. 2000-402257 filed Dec. 28, 2000, the disclosure of which is incorporated herein by reference in its entirety.

What is claimed is:

1. A silicon nitride sintered material comprising:
   a silicon nitride component and silicon carbide; wherein
   said silicon nitride component comprises silicon nitride;
   said silicon carbide is present in an amount such that a mass ratio of silicon carbide to the silicon nitride component is at least 1:100 and less than 4:100;
   said silicon carbide has an average particle size of 1 μm or less and is dispersed in the silicon nitride component; and
   said sintered material has a thermal expansion coefficient of at least 3.7 ppm/° C. between room temperature and 1,000° C.
   where the silicon nitride component contains a rare earth element in an amount of 15–25 mass % as reduced to a certain oxide thereof, and Cr in an amount of 5–10 mass % as reduced to a certain oxide thereof.

2. The silicon nitride sintered material according to claim 1, comprising an intergrain region and a crystalline phase present in the intergrain region of the sintered material.

3. A process for producing a silicon nitride sintered material,
   said silicon nitride sintered material comprising:
   a silicon nitride component and silicon carbide; wherein
   said silicon nitride component comprises silicon nitride;
   said silicon carbide is present in an amount such that a mass ratio of silicon carbide to the silicon nitride component is at least 1:100 and less than 4:100;
   said silicon carbide has an average particle size of 1 μm or less and is dispersed in the silicon nitride component; and
   said sintered material has a thermal expansion coefficient of at least 3.7 ppm/° C. between room temperature and 1,000° C.,
   wherein the silicon nitride component contains a rare earth element in an amount of 15–25 mass % as reduced to a certain oxide thereof, and Cr in an amount of 5–10 mass % as reduced to a certain oxide thereof,
   which process comprises firing a raw material powder mixture containing a silicon nitride component, silicon carbide, a rare earth element compound and a Cr compound.

4. The process for producing a silicon nitride sintered material according to claim 3, wherein said silicon nitride sintered material comprises an intergrain region and a crystalline phase which has precipitated in the intergrain region.

5. A glow plug comprising:
   a ceramic base member comprising a silicon nitride sintered material,
   said silicon nitride material comprising:
   a silicon nitride component and silicon carbide; wherein
   said silicon nitride component comprises silicon nitride;
   said silicon carbide is present in an amount such that a mass ratio of silicon carbide to the silicon nitride component is at least 1:100 and less than 4:100;
   said silicon carbide has an average particle size of 1 μm or less and is dispersed in the silicon nitride component; and
   said sintered material has a thermal expansion coefficient of at least 3.7 ppm/° C. between room temperature and 1,000° C.
   wherein the silicon nitride component contains a rare earth element in an amount of 15–25 mass % as reduced to a certain oxide thereof, and Cr in an amount of 5–10 mass % as reduced to a certain oxide thereof.

* * * * *